(12) United States Patent
Heck et al.

(10) Patent No.: US 10,996,408 B2
(45) Date of Patent: May 4, 2021

(54) OPTICAL DEVICE INCLUDING BURIED OPTICAL WAVEGUIDES AND OUTPUT COUPLERS

(71) Applicant: Intel Corporation, Santa Clara, CA (US)

(72) Inventors: John Heck, Berkeley, CA (US); Harel Frish, Qiryat Gat (IL); Reece DeFrees, Rio Rancho, NM (US); George A. Ghiurcan, Corrales, NM (US); Hari Mahalingam, San Jose, CA (US); Pegah Seddighian, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/517,159

(22) Filed: Jul. 19, 2019

(65) Prior Publication Data

US 2019/0339466 A1 Nov. 7, 2019

(51) Int. Cl.
*G02B 6/42* (2006.01)
*G02B 6/12* (2006.01)
*G02B 6/122* (2006.01)

(52) U.S. Cl.
CPC ......... *G02B 6/4206* (2013.01); *G02B 6/4246* (2013.01)

(58) Field of Classification Search
CPC .. G02B 6/4206; G02B 6/4246; G02B 6/4214; G02B 6/305; G02B 6/136; G02B 6/1228; G02B 2006/12061
See application file for complete search history.

(56) References Cited

U.S. PATENT DOCUMENTS

| | | | | |
|---|---|---|---|---|
| 6,993,225 B2* | 1/2006 | Patel | ........................ | G02B 6/42 385/30 |
| 8,319,237 B2* | 11/2012 | Liu | ..................... | H01L 31/0232 257/98 |
| 8,731,346 B2* | 5/2014 | Tseng | ................. | G02B 6/12004 385/14 |
| 9,285,554 B2* | 3/2016 | Doany | ............... | G02B 6/12002 |
| 9,348,099 B2* | 5/2016 | Krishnamurthi | ....... | G02B 6/136 |

(Continued)

OTHER PUBLICATIONS

Extended European Search Report dated Sep. 16, 2020 for EP Application No. 20162930.0, 11 pages.

(Continued)

*Primary Examiner* — Ryan A Lepisto
(74) *Attorney, Agent, or Firm* — Schwabe, Williamson & Wyatt, P.C.

(57) ABSTRACT

Embodiments of the present disclosure are directed toward techniques and configurations for an optical coupler including an optical waveguide to guide light to an optical fiber. In embodiments, the optical waveguide includes a tapered segment to propagate the received light to the optical fiber. In embodiments, the tapered segment is buried below a surface of a semiconductor substrate to transition the received light within the semiconductor substrate from a first optical mode to a second optical mode to reduce a loss of light during propagation of the received light from the optical waveguide to the optical fiber. In embodiments, the surface of the semiconductor substrate comprises a bottom planar surface of a silicon photonic chip that includes at least one or more of passive or active photonic components. Other embodiments may be described and/or claimed.

14 Claims, 8 Drawing Sheets

(56) References Cited

U.S. PATENT DOCUMENTS

| | | | |
|---|---|---|---|
| 9,658,396 B2 * | 5/2017 | Rong | G02B 1/045 |
| 9,958,607 B2 * | 5/2018 | Yanagisawa | G02B 6/305 |
| 10,032,970 B2 * | 7/2018 | Saito | G02B 6/4253 |
| 2002/0191916 A1 | 12/2002 | Frish et al. | |
| 2005/0105853 A1 | 5/2005 | Liu et al. | |
| 2018/0172909 A1 | 6/2018 | Asghari et al. | |

OTHER PUBLICATIONS

R. Zengerle et al., "Tapered two-layer InGaAsP/InP waveguides for highly efficient chip coupling to single-mode fiber," Optics Communications, Apr. 1, 1995, 8 pages.

O Mitomi et al., "Design of Single-Mode Tapered Waveguide for Low-Loss Chip-to-Fiber Coupling," IEEE Journal of Quantum Electronics, vol. 30, No. 8, Aug. 30, 1994, 8 pages.

* cited by examiner

OPTICAL DEVICE INCLUDING BURIED OPTICAL WAVEGUIDES AND OUTPUT COUPLERS

FIELD

Embodiments of the present disclosure generally relate to the field of optoelectronics, and more particularly, to techniques and configurations for providing silicon optical waveguides and output couplers.

BACKGROUND

Silicon photonics is often considered one of the most popular and successful technology platforms based on planar photonics circuits for cost effective optoelectronics integration. Optical waveguide-based photonics devices such as lasers, modulators, and detectors are typically fabricated on silicon-on-insulator (SOI) wafers. In SOI photonic systems, light is typically confined in a wafer (or chip) plane. Silicon waveguides are typically designed with sub-micron cross-sections, allowing dense integration of active and passive devices to achieve higher speed and lower driving power. Optical mode converters (OMCs) are typically used to improve optical coupling between optical waveguides and optic fibers.

Optical coupling between a silicon photonic waveguide and an optical fiber, however, can be challenging because light is typically confined very tightly in waveguides but much more loosely in an optical fiber (e.g., supported optical mode sizes can range from submicron in a silicon waveguide to approximately 10 micrometers ($\mu$m) in an optical fiber). The numerical aperture (NA) of a waveguide or fiber is a critical figure, because it determines how much the light will diverge. A thin/narrow waveguide will have a high NA and high divergence, whereas a wide/thick waveguide will have a lower NA and lower divergence. Note that the higher the NA, the higher the number of modes associated with the waveguide. A low NA of a waveguide may be desirable to enable efficient coupling to the optical fiber; however, waveguides with sufficiently low NA typically require relatively thick films, e.g., semiconductor films, on the order of ~10 micrometers ($\mu$m,) which can be challenging to process due to stress, topography, and throughput concerns.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Embodiments of the present disclosure describe techniques and configurations for an optical apparatus including a tapered segment buried below a surface of a semiconductor substrate, e.g., a plane of a silicon wafer, and formed to transition an optical mode of light received at the optical waveguide to approach an optical mode of the optical fiber. In embodiments, an optical apparatus includes an optical waveguide to guide light to an optical fiber and includes a first end and a second end, wherein the first end is to receive light input from a light source and the second end includes a tapered segment to propagate the received light to an optical fiber. In embodiments, the tapered segment is buried below a surface of the silicon substrate to transition the light within the silicon substrate from a first optical mode to a second optical mode to reduce a loss of light during propagation of the received light from the optical waveguide to the optical fiber.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. It will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

In various embodiments, the phrase "a first layer formed, deposited, or otherwise disposed on a second layer" may mean that the first layer is formed, deposited, grown, bonded, or otherwise disposed over the second layer, and at least a part of the first layer may be in direct contact (e.g., direct physical and/or electrical contact) or indirect contact (e.g., having one or more other layers between the first layer and the second layer) with at least a part of the second layer.

Figure 1:
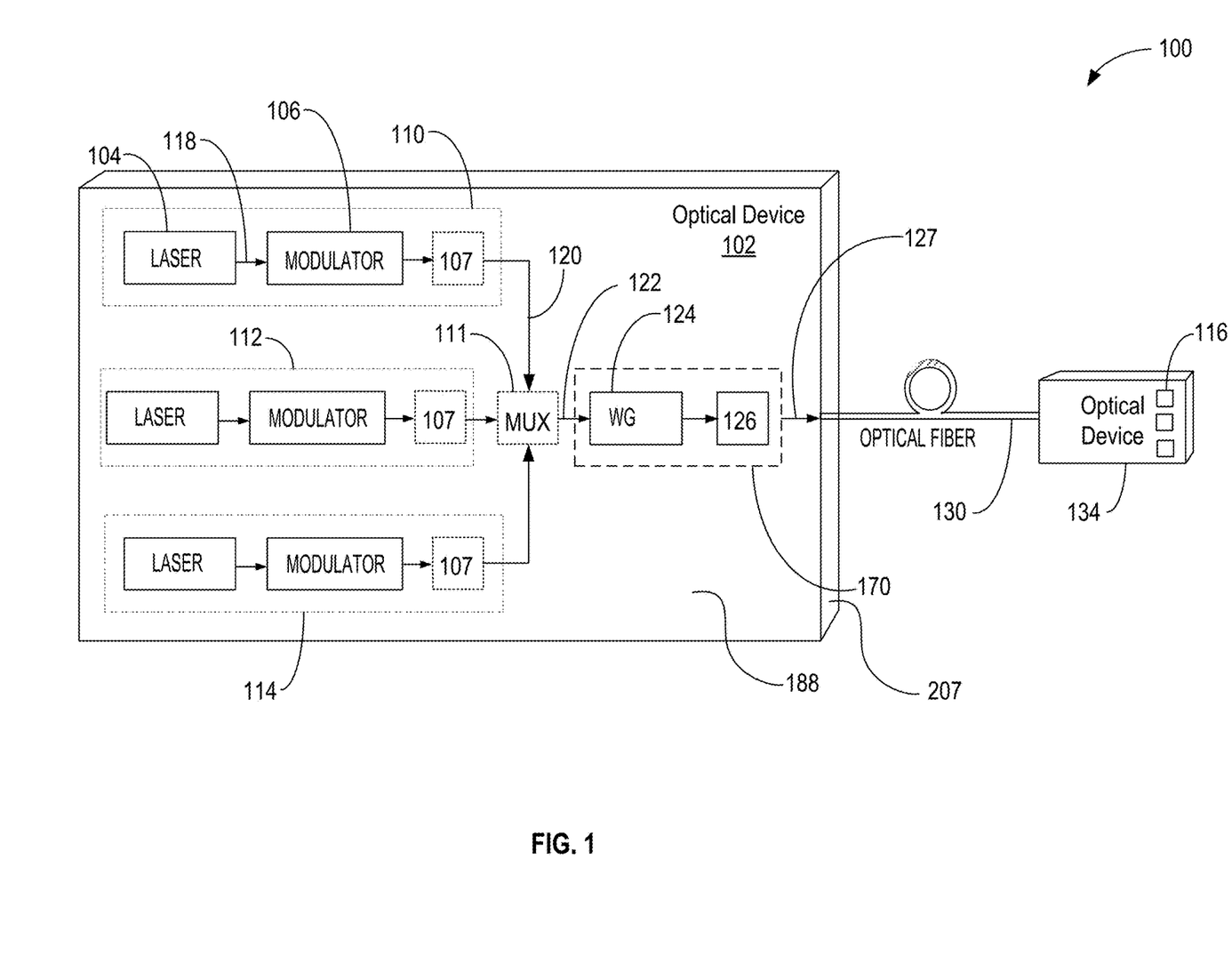
FIG. 1 is a block diagram of an optoelectronic system that includes an optical device including an optical coupler having an optical waveguide buried below a surface of a semiconductor substrate, in accordance with some embodiments as described herein.

FIG. 1 is a block diagram of an optoelectronic system 100 that includes an optical coupler including an optical waveguide buried below a surface of a semiconductor substrate, as described herein, in accordance with some embodiments. In embodiments, the optical waveguide includes a tapered segment buried below a surface of a semiconductor substrate, e.g., silicon substrate, to transition light received at a first end of the optical waveguide from a first optical mode to a second optical mode to reduce a loss of light to optically couple the optical waveguide to an optical fiber. In embodiments, the surface is a planar surface of a semiconductor photonic integrated circuit chip, e.g., silicon photonic chip, where the silicon photonic chip includes at least one or more of waveguides, lasers, photodetectors, modulators, splitters, and other passive or active photonic components. In embodiments, the planar surface is a first or second surface of the silicon photonic chip. In embodiments, the planar surface is a bottom planar surface of the silicon photonic chip.

The optoelectronic system 100 may be used to transmit an optical signal modulated with a data signal via an optical fiber, for example, between racks in a data center, or long-distance, between data storage facilities, data centers, and the like. In embodiments, the optoelectronic system 100 may be an optical communication system including an optical apparatus. In embodiments, the optical apparatus includes or is an optical device 102, e.g. a photonic circuit or photonic chip, including a bottom surface 188 of a semiconductor substrate 207 under which an optical coupler 170 (that may serve as an optical mode converter (OMC)), including a waveguide 124, is buried. In embodiments, optical waveguide 124 is coupled to (or may include) an output coupler 126. In some embodiments, optical device 102 includes an optical transmitter, optical receiver, or optical transceiver. Thus, in embodiments, optical device 102 includes at least one or more of waveguides, lasers, photodetectors, modulators, splitters, and other passive or active photonic components. For example, as shown, optical device 102 includes one or more light sources (e.g., laser devices) 104 to provide a light signal 118 (e.g., constant light intensity signal) to a respective modulator 106 to modulate input light according to a data signal to be transmitted.

Each combination of the light source 104 and corresponding modulator 106 may comprise a communication channel 110, 112, 114. In some embodiments, the modulator 106 may output a modulated optical signal 120 to a splitter 107 and a multiplexer 111, where the signal may form a combined signal 122, to be input to optical coupler 170. In embodiments, optical coupler 170 includes optical waveguide 124 including a tapered segment buried under a planar semiconductor substrate to transition light within the semiconductor substrate from a first optical mode to a second optical mode to assist in lowering a loss of light during propagation of the received light from the optical waveguide to the optical fiber.

Alternatively, the signals (e.g., 120) from communication channels 110, 112, and 114 may be directly input to the optical coupler 170. The optical coupler 170 may provide the interface from the channels 110, 112, 114 to an optical communication channel (e.g., optical fiber cable or other configuration that may include coupling optics followed by fiber) 130 and may be configured to transfer the optical signal 127 to the optical communication channel 130, to be received by another optical device 134. In some embodiments, optical device 134 may also include an optical waveguide that may receive light from an optical fiber and include a tapered segment buried below a surface of the semiconductor substrate to transition the received light within the semiconductor substrate from a first optical mode to a second optical mode to reduce a loss of light during propagation of the received light from the optical waveguide from the optical fiber. In order to simplify FIG. 1, various elements of optical device 102 and 134 are not shown. For example, note that in embodiments, optical device 134 may include, e.g., a demultiplexer, photodetectors (e.g., 116), and other passive or active photonic components.

Figure 2A:
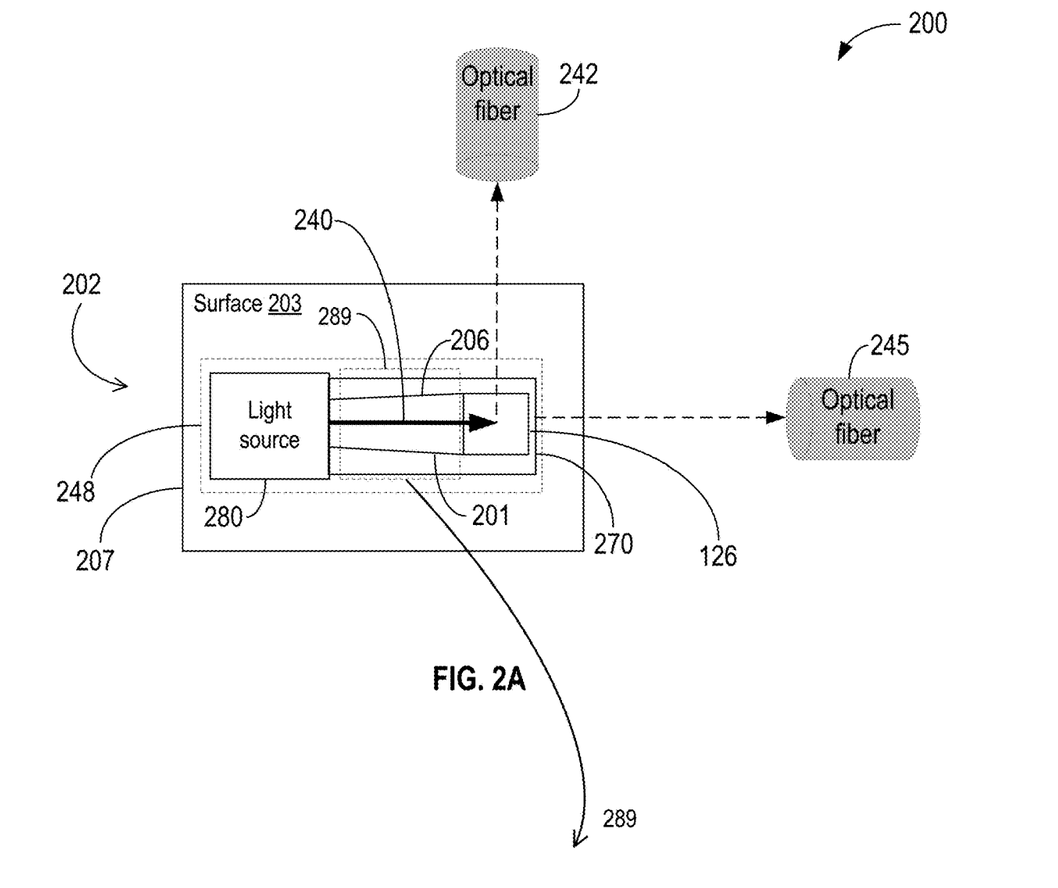
FIG. 2A is a block diagram 200 of a top down view of a portion of the optical device of FIG. 1, shown in greater detail, in accordance with some embodiments.

FIG. 2A is a block diagram 200 of a top down view of a portion of a surface of an example optical device 202 (similar to device 102) depicting an optical coupler including an optical waveguide buried below a surface of a semiconductor substrate in greater detail, in accordance with some embodiments. In embodiments, block diagram 200 illustrates an area 248 that may be located under a surface 203 of a semiconductor substrate, e.g., a bottom surface of optical device 202. As shown, the optical coupler 270 (e.g., similar to optical coupler 170) includes an optical waveguide 201 including a first end to receive light from a light source 280 (e.g., laser 104 or other component of optical device 102) and a second end that includes a tapered segment 206 to propagate the received light to the optical fiber. In embodiments, the first optical mode includes an optical mode of the received light and the second optical mode includes an optical mode of the optical fiber.

In some embodiments, optical waveguide 201 is coupled to an output coupler component 126 such as a mirror and/or lens, to reflect light 240 to, e.g., optical fiber 242. In other embodiments, optical coupler 270 may couple the optical waveguide to an optical fiber, e.g., optical fiber 245, without a mirror or lens (e.g., as will be later shown and discussed in connection with FIGS. 5 and 6A). For example, in embodiments, optical waveguide 201 may simply include an output facet that is directly coupled to optical fiber 245.

Figure 2B:
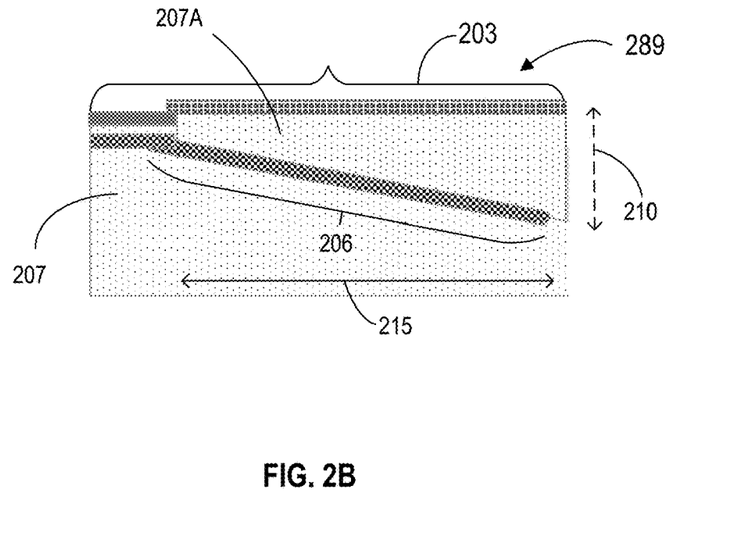
FIG. 2B illustrates a cross-sectional side view of a portion of the example optical device of FIG. 2A, in accordance with embodiments.

Accordingly, FIG. 2B illustrates a cross-sectional side view of a portion 289 of example optical device 202 of FIG. 2A. In FIG. 2B, the cross-sectional side view illustrates more clearly that tapered segment 206 includes a semiconductor material 207A and is buried below planar surface 203 of, e.g., a silicon substrate 207. In embodiments, a cross-sectional dimension (e.g., as shown by arrow 210) of tapered segment 206 has a numerical aperture (NA) that approaches or substantially matches the NA of an optical fiber (e.g., optical fiber 242 or 245 of FIG. 2A). In some embodiments, the cross-sectional dimension has a thickness of approximately 10 micrometers. Note that in embodiments, a length 215 of tapered segment 206 is 800-1000 micrometers. In embodiments, tapered segment 206 is formed to have a length and a cross-sectional dimension to adiabatically transition the received light to approach an optical mode of the optical fiber.

Figure 5:
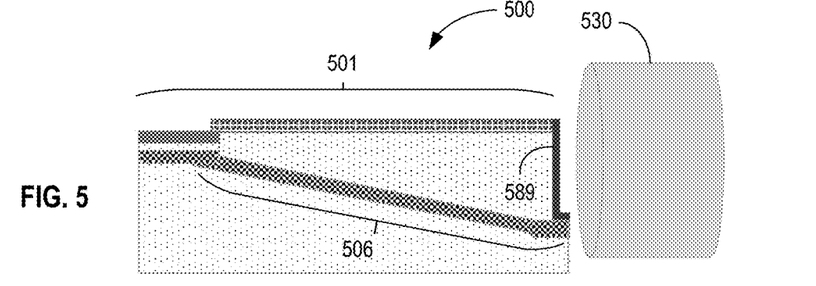
FIGS. 5, 6A, 6B, and 7 illustrate various types of optical couplers, including the optical waveguide of FIGS. 1-4K, in accordance with embodiments.
Figure 6A:
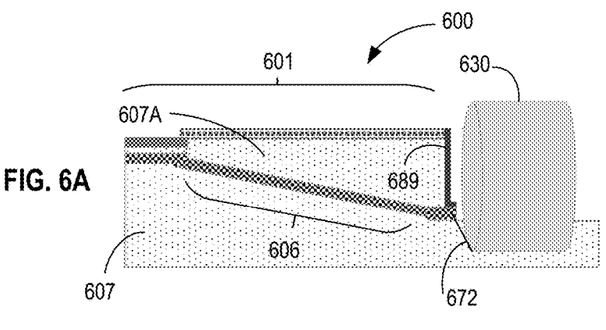
Figure 7:
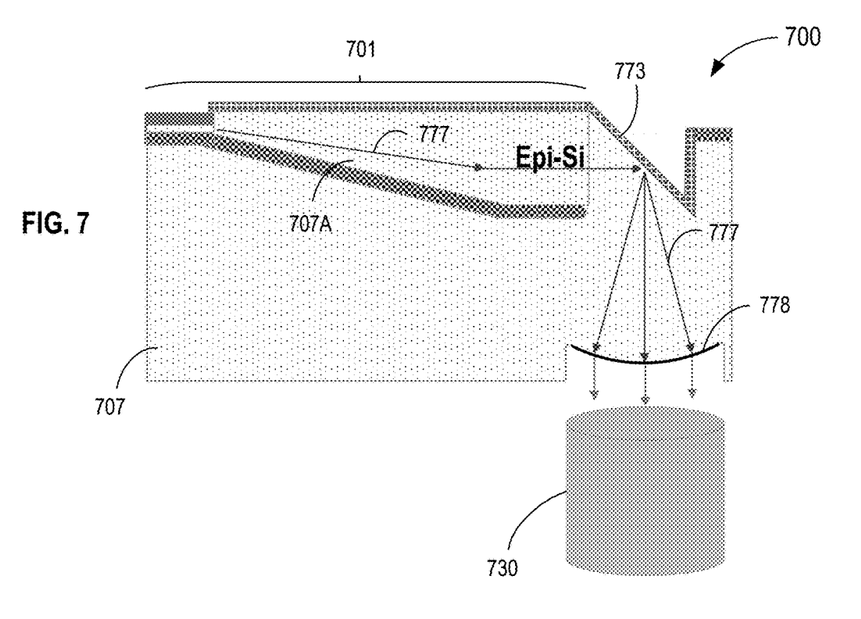

As will be shown with respect to FIGS. 5, 6A, and 7, in embodiments, tapered segment 206 of optical waveguide 201 is coupled to an output facet to form various types of optical couplers. In embodiments, the output facet is etched within the silicon substrate, e.g., silicon substrate 207.

Figure 3:
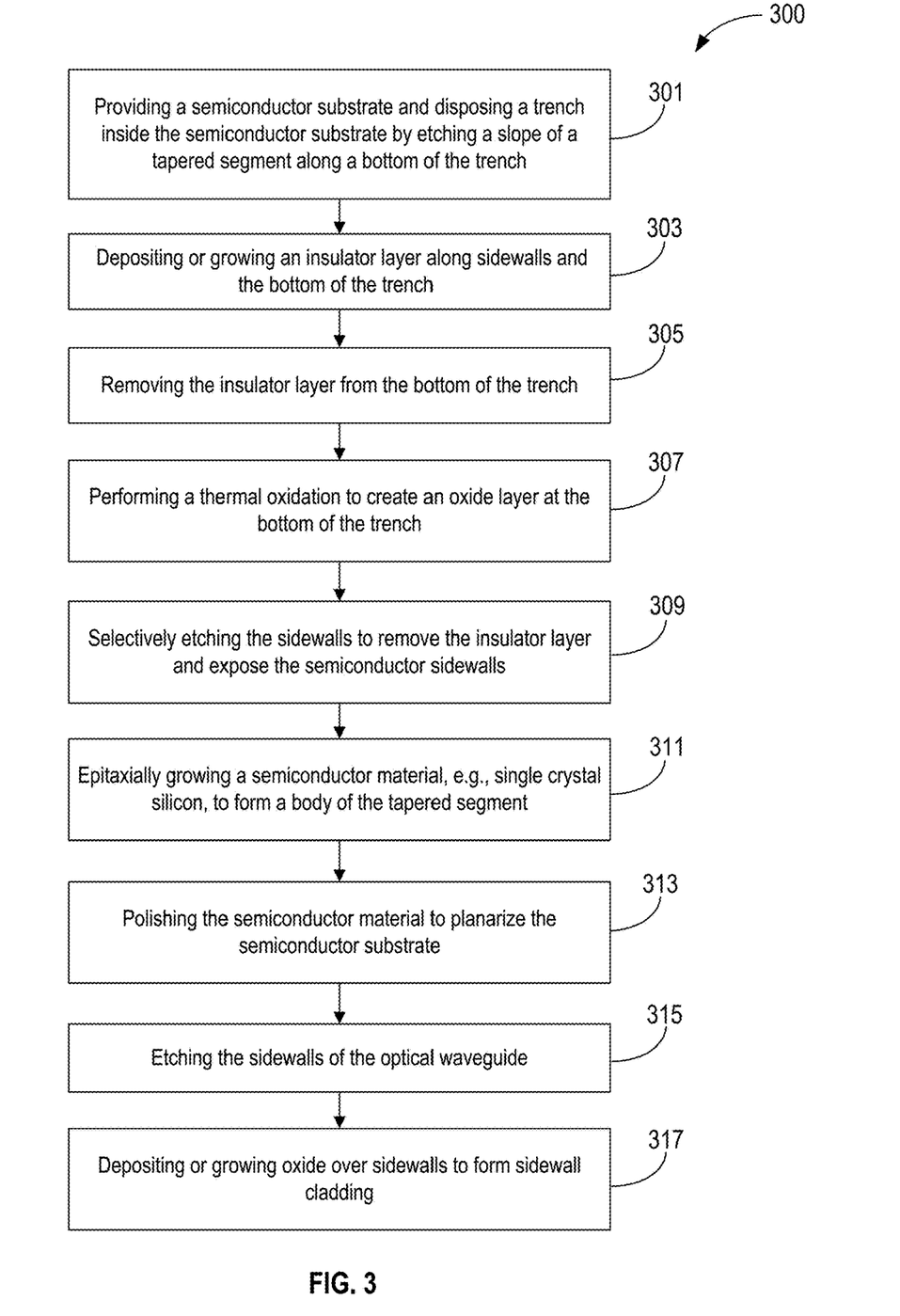
FIG. 3 is a flow diagram describing a process 300 of forming an optical waveguide, such as the optical waveguide of the optical device of FIG. 1, in accordance with embodiments.

Next, FIG. 3 and FIGS. 4A-4I are discussed together below. FIG. 3 is a flow diagram describing a process 300 of forming an optical waveguide similar to, e.g. optical waveguide 201 of FIG. 2, which includes a tapered segment buried below a planar surface of a silicon substrate, in accordance with embodiments. In embodiments, FIGS. 4A-4I illustrate on a left side of the FIGs., a side view, and, on a right side, an end view of a semiconductor substrate 407 ("substrate 407") in various stages associated with process 300. In embodiments, semiconductor substrate 407 is similar to or the same as semiconductor substrate 207 of FIG. 2. Note that FIGS. 4B-4I include same or similar elements as introduced in FIG. 4A and/or previous FIGs. of the sequence and as such, for purposes of clarity only certain elements will be reintroduced.

Figure 4A:
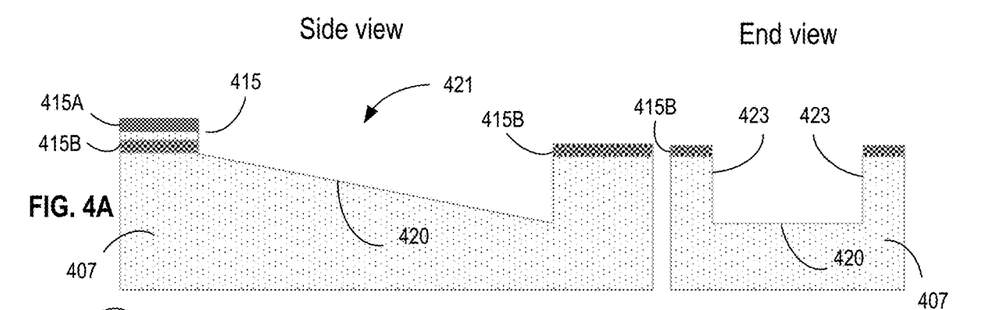
FIGS. 4A-4I illustrate cross-sectional side and end views of a semiconductor substrate, in various stages associated with process 300, in accordance with embodiments.

To begin, in embodiments, at a block 301, process 300 includes providing a semiconductor substrate and disposing a trench inside the semiconductor substrate, e.g., a silicon wafer, by etching a slope of a tapered segment along a bottom of the trench. Accordingly, referring to FIG. 4A, semiconductor substrate 407 is depicted subsequent to providing a silicon-on-insulator (SOI) wafer including cladding layers 415A and 415B (e.g., inter-dielectric layers or ILD) towards a top of substrate 407 that may, on a left side of substrate 407, eventually form a straight segment 415 of the optical waveguide. In embodiments, disposing the trench includes utilizing analog lithography, e.g., a grayscale lithography process, to create a three-dimensional taper "mold" within substrate 407. Accordingly, as shown in FIG. 4A, in some embodiments, a grayscale etch is used to etch a trench 421 including a bottom 420 and sidewalls 423.

Figure 4B:
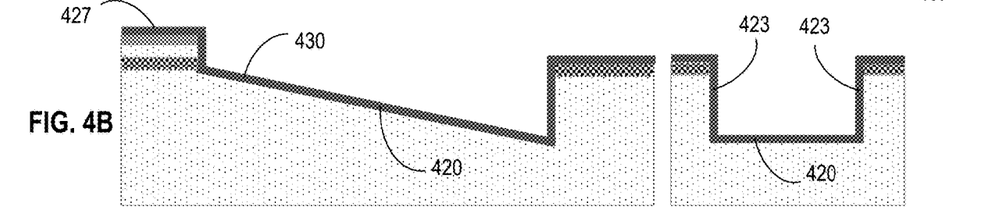

Returning to FIG. 3, at block 303, the process 300 includes depositing or growing an insulator layer along sidewalls and the bottom of the trench, according to embodiments. Correspondingly, as shown in FIG. 4B, an insulator layer 430 covers a bottom 420 of trench 421 and over sidewalls 423, and top surfaces 427 of substrate 407. In embodiments, the insulator layer 430 includes silicon nitride (SiN) or other suitable insulator layer with similar properties.

Figure 4C:
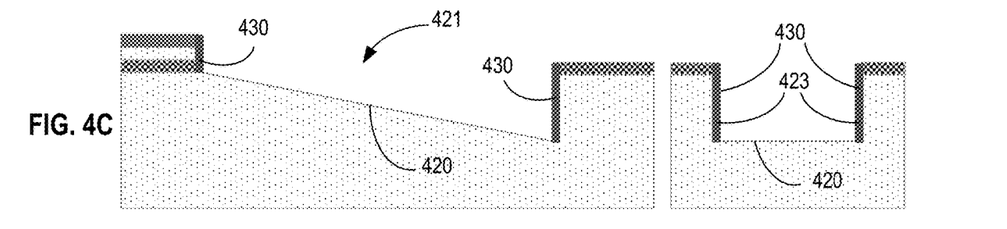
Figure 4D:
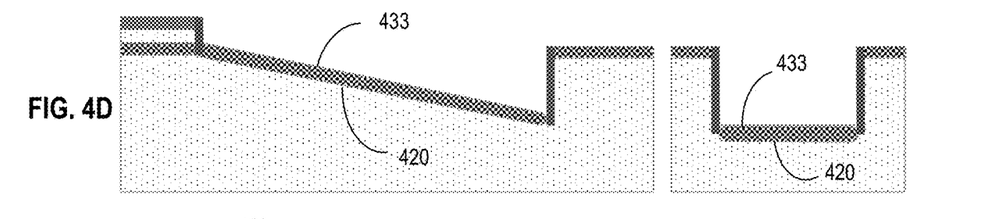
Figure 4E:
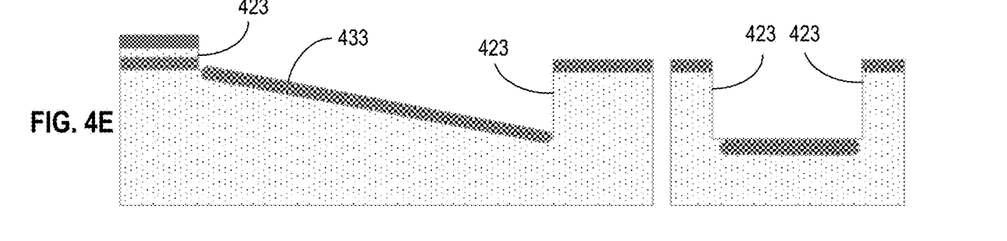
Figure 4F:
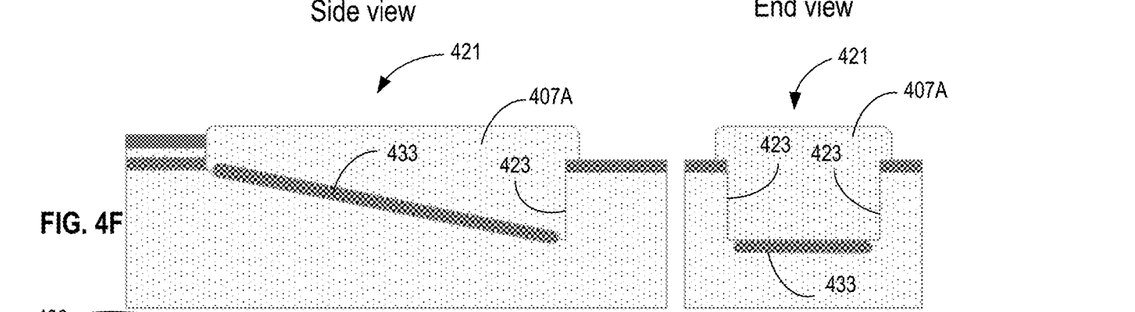
Figure 4G:
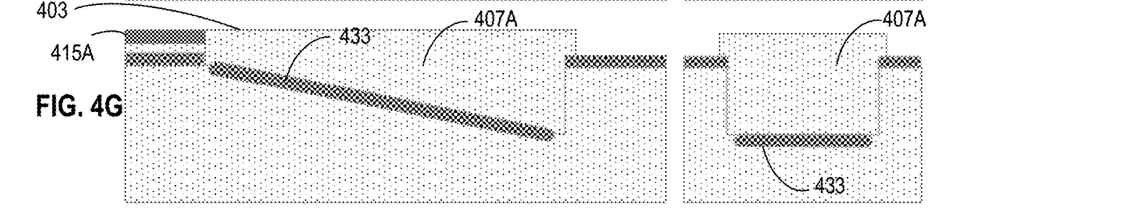
Figure 4H:
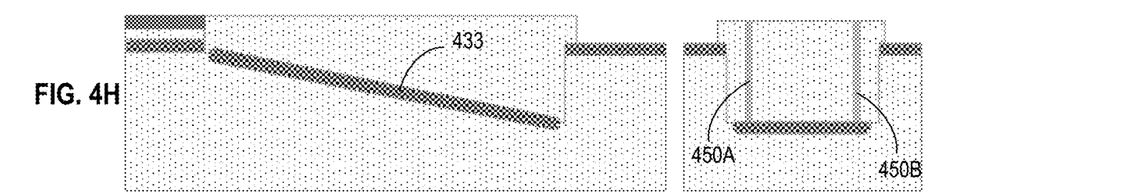

Next, in the embodiment, at block 305, process 300 includes removing the insulator layer from the bottom of the trench. Accordingly, as shown in FIG. 4C, insulator layer 430, e.g., SiN, is removed from bottom 420 of trench 421 (as well as top surfaces 427), while remaining intact on various portions of trench 421 including sidewalls 423. In embodiments, a directional etch is used to remove insulator layer 430 from bottom 420 of trench 421. In embodiments, a process associated with block 305 may include a spacer process.

Next, in the embodiment, at block 307, process 300 includes performing a thermal oxidation to create an oxide layer at bottom of the trench that will form a cladding of the taper segment of the optical waveguide. According to embodiments, as shown in corresponding FIG. 4D, oxide layer 433 covers bottom 420 of trench 421 after the thermal oxidation is performed.

In the embodiments, at next block 309, process 300 includes selectively etching sidewalls to remove insulator layers, e.g., insulator layer(s) 430, to expose semiconductor sidewalls 423. Accordingly, in FIG. 4E, bare semiconductor sidewalls 423 are shown subsequent to etching to remove the insulator layer(s) 430.

Next, at block 311, according to embodiments, process 300 includes epitaxially growing a semiconductor material 407A in trench 421 to form a body of the tapered segment. In embodiments, bare semiconductor sidewalls 423 seed crystal growth in a silicon epitaxial growth process to fill trench 421. Accordingly, as shown in corresponding FIG. 4F, semiconductor material 407A includes single crystal silicon and covers oxide layer 433 over bottom 420 of trench 421.

In embodiments, next block 313 includes polishing the semiconductor material to planarize a surface 403 of the semiconductor material 407A, e.g., single crystal silicon. As shown in corresponding FIG. 4G, after the polishing and/or optional etching, surface 403 is level with a top cladding layer 415A of what will be a straight portion of the optical waveguide, according to embodiments.

Next, in embodiments, at block 315, process 300 includes etching of what will form actual sidewalls of the optical waveguide. In embodiments, FIG. 4H, optical waveguide sidewalls 450A and 450B are defined using a silicon etch.

Figure 4I:
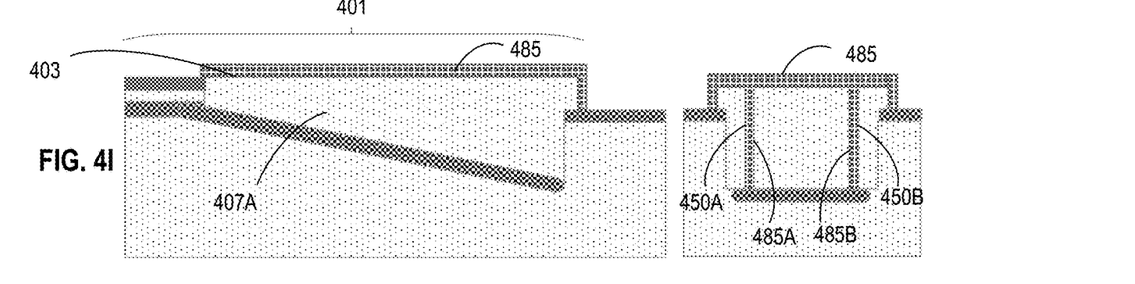

Next, in embodiments, at a final block 317 of FIG. 3, process 300 includes depositing or growing oxide to form sidewall cladding for optical waveguide sidewalls 450A and 450B to form optical waveguide 401. As shown in FIG. 4I, oxide 485 forms a layer (see, e.g., layers 485A and 485B) over sidewalls 450A and 450B as well as surface 403 of single crystal silicon of semiconductor material 407A. Accordingly, in embodiments, single crystal silicon of semiconductor material 407A forms a relatively large, low numerical-aperture (NA) waveguide buried within the semiconductor substrate, e.g., semiconductor substrate 407 of FIG. 4A. In embodiments, the single crystal silicon, in addition to having little or zero variability in refractive index, may add little or no topography to a silicon wafer including the semiconductor substrate, and add low or minimal stress/bow to the silicon wafer. In addition, as shown below, optical waveguide 401 residing within a silicon wafer enables integration of silicon mirrors, lenses, and anti-reflective (AR) coatings to enable new and simplified optical coupling architectures.

Accordingly, in embodiments, optical waveguide 401 may form a basis of an optical coupler between an optical device (e.g., photonic chip) and an optical fiber (e.g., as shown in FIGS. 1 and 2A). Note that in an edge-coupling architecture, an output facet can be fabricated, e.g., after process 300 or after additional processes associated with forming optical device 102 or 202. For example, FIGS. 4J and 4K illustrate a further process associated with forming an optical coupler such as, e.g., an optical edge coupler or V-groove coupler (as will be shown in connection with, e.g., respective FIGS. 5 and 6A/6B).

Figure 4J:
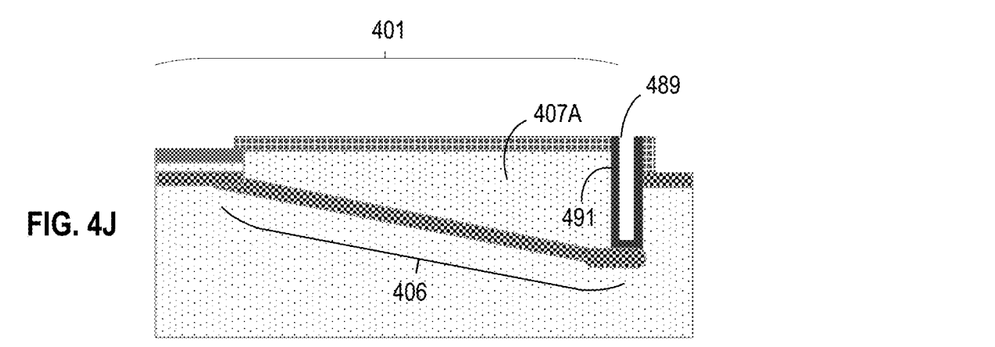
FIGS. 4J and 4K illustrate cross-sectional side and end views of a semiconductor substrate, in various stages associated with forming an optical edge coupler in accordance with various embodiments.

In FIG. 4J, a facet 489 is etched vertically in semiconductor material 407A of tapered segment 406 of optical waveguide 401. In embodiments, an anti-reflective coating (ARC) layer 491 is deposited over facet 489. In embodiments, ARC layer 491 is deposited to reduce reflection of the light being output from tapered segment 406. In some embodiments, ARC layer 491 may be an oxide-ARC layer and may reduce optical losses due to reflection at interface of the waveguide with another medium. In some embodiments, ARC layer 491 may include silicon nitride (SiN) or silicon-oxynitride (SiON) or other suitable layer to reduce such optical losses.

Figure 4K:
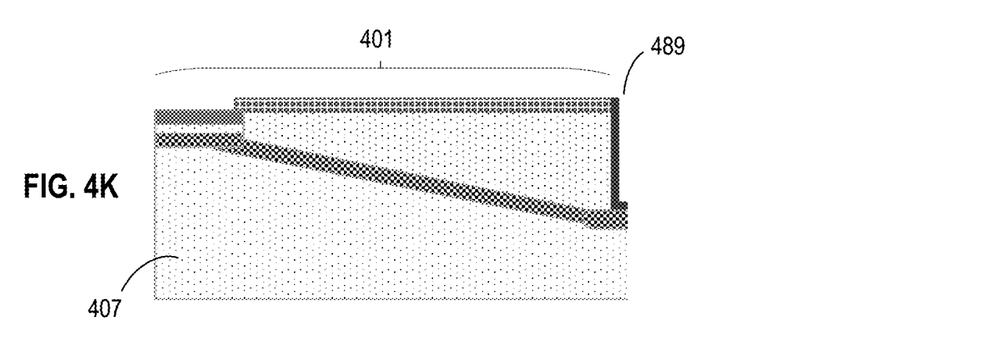

Next, according to embodiments, FIG. 4K illustrates optical waveguide 401 subsequent to a combination of etching and sawing to remove end portions of substrate 407. In embodiments, facet 489 is exposed to allow an optical fiber to be brought into proximity and butt-coupled (or otherwise coupled) to facet 489 (e.g., see FIGS. 5 and 6A/6B).

Figure 6B:
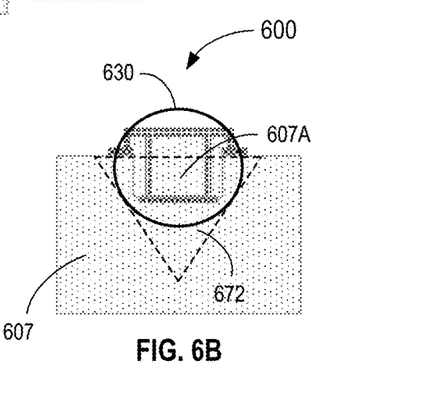

Referring now to FIGS. 5-7, in embodiments, an optical waveguide (similar to optical waveguide 401 of FIG. 4) may form the basis of an optical coupler, e.g., a respective output edge coupler, V-groove coupler, or backside optical coupler. As shown in the embodiment of FIG. 5, optical waveguide 501 forms a portion of an optical edge coupler 500 to butt-couple an optical fiber 530 directly to optical waveguide 501. As shown, an output facet 589 is coupled to an output end of a buried tapered segment 506 of optical waveguide 501 (note that a method associated with embodiments of forming optical edge coupler 500 is described and shown above with respect to FIGS. 4J and 4K). In embodiments, and as noted in connection with FIG. 4J, output facet 589 is covered with an AR coating. Note that as with previously discussed Figures, the Figures are not necessarily drawn to scale. For example, an output facet, e.g., output facet 589, may be approximately 10 μm square, and a coupled optical fiber, e.g., optical fiber 530, may be typically 125 μm in diameter.

Next, FIG. 6A illustrates a side cross-sectional view, and FIG. 6B illustrates an end cross-sectional view of a V-groove optical coupler 600. In embodiments, an optical fiber 630 sits in a V-groove 672 of silicon substrate 607 to receive light from an optical waveguide 601, similar to optical waveguide 401 of, e.g., FIG. 4K. In embodiments, V-groove optical coupler 600 includes an output facet, e.g., 689, etched in, e.g., a semiconductor substrate 607A, a second end, or at an output end of a tapered segment 606 of optical waveguide 601.

Referring now to FIG. 7, which illustrates a backside optical coupler 700. In embodiments, backside optical coupler 700 includes an optical waveguide 701 coupled to a silicon lens etched within a semiconductor substrate 707, similar to, e.g., semiconductor substrate 407, to receive light reflected from a tapered segment of an optical waveguide. As shown in FIG. 7, backside optical coupler 700 includes a mirror 773 and a lens 778 that are etched into semiconductor substrate 707 using greyscale lithography techniques, in embodiments. Accordingly, once an optical mode of, e.g., light rays 777, traveling through a thick silicon layer, e.g., semiconductor material 707A, is expanded, light rays 777 can be focused using mirror 773 and lens 778. Accordingly, mirror 773 receives light, e.g., rays 777, to focus a portion of the light to lens 778 through a backside of the silicon wafer into optical fiber 730. Note that in many high-volume applications, there may be a strong motivation to pursue vertical coupling through the backside of a silicon wafer. For example, backside coupling in particular may allow adoption of a conventional flip chip integrated circuit architecture, with electrical input/output (I/Os) on the silicon wafer surface located opposite to optical I/Os. Accordingly, in embodiments, lens 778 may be a lens monolithically integrated onto the backside of a semiconductor substrate of, e.g., optical device 102 or 134 of FIG. 1 or optical device 202 of FIG. 2.

Figure 8:
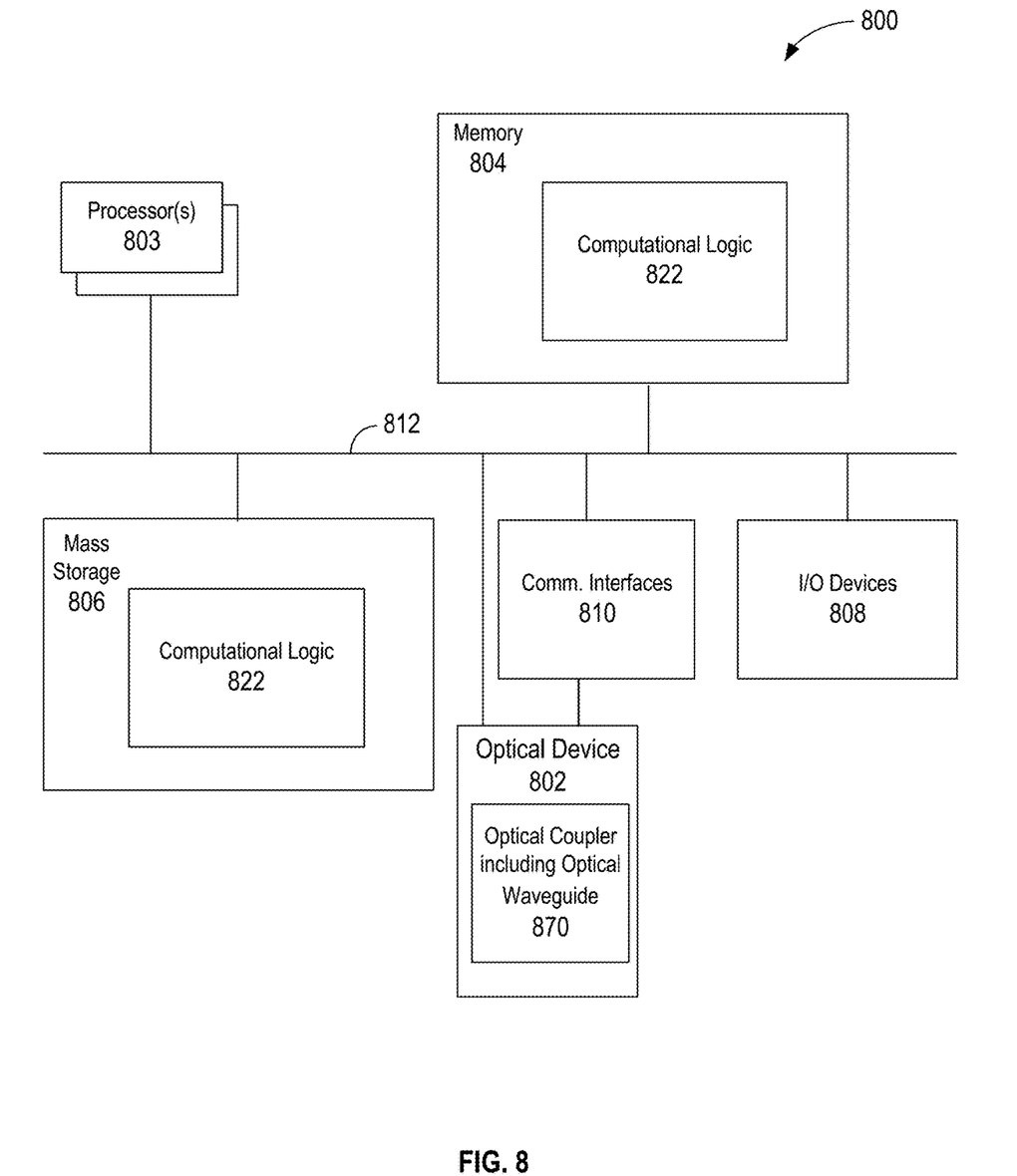
FIG. 8 illustrates an example computing device that may include an optical device with an optical coupler of FIGS. 1-7, in accordance with various embodiments.

FIG. 8 illustrates an example computing device 800 suitable for use with various components such as optoelectronic system 100 of FIG. 1, including an optical device 802, e.g., similar to or the same as optical device 102 of FIG. 1. In embodiments, optical device 802 includes, e.g., a coupler including an optical waveguide (e.g., optical waveguide 401, 501, 601, or 701 of respective FIGS. 4K-7) having a tapered segment buried within a semiconductor substrate or under a surface of optical device 802, in accordance with various embodiments as described herein. In embodiments, the tapered segment is to transition the received light within the semiconductor substrate from a first optical mode to a second optical mode to reduce a loss of light during propagation of the received light from the optical waveguide to the optical fiber. As shown, computing device 800 may include one or more processors or processor cores 803 and system memory 804. For the purpose of this application, including the claims, the terms "processor" and "processor cores" may be considered synonymous, unless the context clearly requires otherwise. The processor 803 may include any type of processors, such as a central processing unit (CPU), a microprocessor, and the like. The processor 803 may be implemented as an integrated circuit having multi-cores, e.g., a multi-core microprocessor. The computing device 800 may include mass storage devices 806 (such as diskette, hard drive, volatile memory (e.g., dynamic random-access memory (DRAM), compact disc read-only memory (CD-ROM), digital versatile disk (DVD), and so forth). In general, system memory 804 and/or mass storage devices 806 may be temporal and/or persistent storage of any type, including, but not limited to, volatile and non-volatile memory, optical, magnetic, and/or solid state mass storage, and so forth. Volatile memory may include, but is not limited to, static and/or dynamic random-access memory. Non-volatile memory may include, but is not limited to, electrically erasable programmable read-only memory, phase change memory, resistive memory, and so forth.

The computing device 800 may further include input/output (I/O) devices 808 (such as a display (e.g., a touchscreen display), keyboard, cursor control, remote control, gaming controller, image capture device, and so forth) and communication interfaces 810 (such as network interface cards, modems, infrared receivers, radio receivers (e.g., Bluetooth), and so forth). In some embodiments, the communication interfaces 810 may include or otherwise be coupled with optical device 802 including an optical coupler including an optical waveguide 870 having a tapered segment buried under a surface, e.g., a silicon substrate, as described above, in accordance with various embodiments.

The communication interfaces 810 may include communication chips that may be configured to operate the device 800 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 810 may operate in accordance with other wireless protocols in other embodiments.

The above-described computing device 800 elements may be coupled to each other via system bus 812, which may represent one or more buses. In the case of multiple buses, they may be bridged by one or more bus bridges (not shown). Each of these elements may perform its conventional functions known in the art. In particular, system memory 804 and mass storage devices 806 may be employed to store a working copy and a permanent copy of the programming instructions for the operation of the optical device 802. The various elements may be implemented by assembler instructions supported by processor(s) 803 or high-level languages that may be compiled into such instructions.

The permanent copy of the programming instructions may be placed into mass storage devices 806 in the factory, or in the field, through, for example, a distribution medium (not shown), such as a compact disc (CD), or through communication interface 810 (from a distribution server (not shown)). That is, one or more distribution media having an implementation of the agent program may be employed to distribute the agent and to program various computing devices.

The number, capability, and/or capacity of the elements 808, 810, 812 may vary, depending on whether computing device 800 is used as a stationary computing device, such as a set-top box or desktop computer, or a mobile computing device, such as a tablet computing device, laptop computer, game console, or smartphone. Their constitutions are otherwise known, and accordingly will not be further described.

In embodiments, memory 804 may include computational logic 822 configured to practice aspects of embodiments, such as operation of the optical device 102 (e.g., transmitter, receiver, or transceiver). For one embodiment, at least one of processors 803 may be packaged together with computational logic 822 configured to practice aspects of optical signal transmission and receipt described herein to form a System in Package (SiP) or a System on Chip (SoC).

The computing device 800 may include or otherwise be associated with an optoelectronic system, such as system 100 implementing aspects optical device, including the optical coupler including an optical coupler, e.g., 170 of FIG. 1 or 270 of FIG. 2, including an optical waveguide having a tapered segment buried under a semiconductor substrate of optical device 102, as described above. In some embodiments, at least some components of the optoelectronic system 100 (e.g., optical devices 102 and 134) may be communicatively coupled with the computing device 800 and/or be included in one or more of the computing device 800 components, such as communication interfaces 810, for example. Note that optical device 102 may in some embodiments be included in optical device 134 to receive light from an optical fiber to transition light from a first optical mode to a second optical mode. Thus, in some embodiments, the tapered segment is to reduce a loss of light during propagation of light received from the optical fiber to the optical waveguide.

In various implementations, the computing device 800 may comprise one or more components of a data center, a laptop, a netbook, a notebook, an ultrabook, a smartphone, a tablet, a personal digital assistant (PDA), an ultra mobile PC, a mobile phone, or a digital camera. In further implementations, the computing device 800 may be any other electronic device that processes data.

According to various embodiments, the present disclosure describes a number of examples.

Example 1 may include an optical apparatus comprising an optical waveguide to guide light to an optical fiber, wherein the optical waveguide includes a first end and a second end, wherein the first end is to receive light input from a light source and the second end includes a tapered segment to propagate the received light to the optical fiber; and a semiconductor substrate, wherein the tapered segment is buried below a surface of the semiconductor substrate to transition the received light within the semiconductor substrate from a first optical mode to a second optical mode to reduce a loss of light during propagation of the received light from the optical waveguide to the optical fiber.

Example 2 may include the optical apparatus of Example 1, wherein the surface of the semiconductor substrate comprises a bottom surface of a silicon photonic chip and wherein the silicon photonic chip comprises at least one or more of passive or active photonic components including but not limited to waveguides, lasers, photodetectors, modulators, or splitters.

Example 3 may include the optical apparatus of Example 1, wherein the first optical mode includes an optical mode of the light received at the first end of the optical waveguide and the second optical mode includes an optical mode of the optical fiber.

Example 4 may include the optical apparatus of Example 1, wherein a cross-sectional dimension of the tapered segment has a numerical aperture (NA) that approaches or substantially matches the NA of the optical fiber.

Example 5 may include the optical apparatus of Example 1, wherein a cross-sectional dimension of the tapered segment at the second end of the optical waveguide has a thickness of approximately 10 micrometers.

Example 6 may include the optical apparatus of Example 1, wherein the semiconductor substrate is a silicon substrate and the optical waveguide is formed from epitaxially-grown single-crystal silicon buried within the silicon substrate.

Example 7 may include the optical apparatus of Example 6, wherein the tapered segment of the optical waveguide is coupled to an output facet to form an optical coupler and the output facet is etched within the silicon substrate.

Example 8 may include the optical apparatus of Example 7, wherein the optical coupler is at least one of an optical edge coupler or a backside optical coupler to couple to the optical fiber.

Example 9 may include the optical apparatus of Example 8, wherein the optical coupler comprises an output edge coupler and is to couple the optical fiber directly to the tapered segment.

Example 10 may include the optical apparatus of Example 8, wherein the optical coupler comprises a backside optical coupler and includes a silicon lens etched within the silicon substrate to receive light reflected from the tapered segment.

Example 11 may include the optical apparatus of Example 1, wherein the surface of the semiconductor substrate includes a planar surface of a silicon photonic device.

Example 12 may include a method of forming an optical waveguide of an optical apparatus, comprising providing a semiconductor substrate; and disposing a trench inside the semiconductor substrate, the disposing including forming a tapered segment of the optical waveguide to propagate light to an optical fiber, wherein the tapered segment is to be buried below a surface of the semiconductor substrate to transition the propagated light within the semiconductor substrate to an optical mode of the optical fiber to reduce a loss of light during propagation of the light from the optical waveguide to the optical fiber.

Example 13 may include the method of Example 12, wherein disposing the trench comprises etching a slope of the tapered segment along a bottom of the trench within the semiconductor substrate.

Example 14 may include the method of Example 13, wherein disposing the trench further comprises depositing an insulator layer along sidewalls and the bottom of the trench; removing the insulator layer from the bottom of the trench; and performing a thermal oxidation to create an oxide layer at the bottom of the trench to form a cladding of the optical waveguide.

Example 15 may include the method of Example 14, further comprising epitaxially growing single crystal silicon to form a body of the tapered segment; and polishing the single crystal silicon to planarize the semiconductor substrate.

Example 16 may include the method of Example 12, further comprising etching an output facet to receive the propagated light to assist in coupling the optical waveguide to the optical fiber.

Example 17 may include an optical communications system comprising at least one optical apparatus, wherein the optical apparatus includes a light source; an optical waveguide to guide light to an optical fiber and to include a first end and a second end, wherein the first end is to receive light input from the light source and the second end includes a tapered segment to propagate the received light to the optical fiber; and a semiconductor substrate, wherein the tapered segment is buried below a surface of the semiconductor substrate to transition the received light within the semiconductor substrate from a first optical mode to a second optical mode to reduce a loss of light during propagation of the received light from the optical waveguide to the optical fiber.

Example 18 may include the optical communications system of Example 17, further comprising a lens included in the semiconductor substrate to form a backside optical coupler to assist in coupling the optical waveguide to the optical fiber.

Example 19 may include the optical communications system of Example 17, wherein the optical communication system comprises a transmitter and the light source comprises a laser.

Example 20 may include the optical communications system of Example 17, wherein the optical communications system comprises an optical transceiver including the at least one optical apparatus and further includes one or more photodetectors, modulators, or splitters coupled to the semiconductor substrate.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated implementations, including what is described in the Abstract, is not intended to be exhaustive or to limit the embodiments of the present disclosure to the precise forms disclosed. While specific implementations and examples are described herein for illustrative purposes, various equivalent modifications are possible within the scope of the present disclosure, as those skilled in the relevant art will recognize.

These modifications may be made to embodiments of the present disclosure in light of the above detailed description. The terms used in the following claims should not be construed to limit various embodiments of the present disclosure to the specific implementations disclosed in the specification and the claims. Rather, the scope is to be determined entirely by the following claims, which are to be construed in accordance with established doctrines of claim interpretation.

What is claimed is:

1. An optical apparatus comprising:
an optical waveguide to guide light to an optical fiber, wherein the optical waveguide includes a first end and a second end, wherein the first end is to receive light input from a light source and the second end includes a tapered segment to propagate the received light to the optical fiber; and
a semiconductor substrate, wherein the tapered segment is buried below a surface of the semiconductor substrate to transition the received light within the semiconductor substrate from a first optical mode to a second optical mode to reduce a loss of light during propagation of the received light from the optical waveguide to the optical fiber, wherein the tapered segment of the optical waveguide is coupled to an output facet to form an optical coupler and the output facet is etched within the semiconductor substrate.

2. The optical apparatus of claim 1, wherein the surface of the semiconductor substrate comprises a bottom surface of a silicon photonic chip and wherein the silicon photonic chip comprises at least one or more of passive or active photonic components including but not limited to waveguides, lasers, photodetectors, modulators, or splitters.

3. The optical apparatus of claim 1, wherein the first optical mode includes an optical mode of the light received at the first end of the optical waveguide and the second optical mode includes an optical mode of the optical fiber.

4. The optical apparatus of claim 1, wherein a cross-sectional dimension of the tapered segment has a numerical aperture (NA) that approaches or substantially matches the NA of the optical fiber.

5. The optical apparatus of claim 1, wherein a cross-sectional dimension of the tapered segment at the second end of the optical waveguide has a thickness of approximately 10 micrometers.

6. The optical apparatus of claim 1, wherein the semiconductor substrate is a silicon substrate and optical waveguide is formed from epitaxially-grown single-crystal silicon buried within the silicon substrate.

7. The optical apparatus of claim 6, wherein the optical coupler is at least one of an optical edge coupler or a backside optical coupler to couple to the optical fiber.

8. The optical apparatus of claim 7, wherein the optical coupler comprises an output edge coupler and is to couple the optical fiber directly to the tapered segment.

9. The optical apparatus of claim 6, wherein the optical coupler comprises a backside optical coupler and includes a silicon lens etched within the silicon substrate to receive light reflected from the tapered segment.

10. The optical apparatus of claim 1, wherein the surface of the semiconductor substrate includes a planar surface of a silicon photonic device.

11. An optical communications system comprising at least one optical apparatus, wherein the optical apparatus includes:
- a light source;
- an optical waveguide to guide light to an optical fiber and to include a first end and a second end, wherein the first end is to receive light input from the light source and the second end includes a tapered segment to propagate the received light to the optical fiber; and
- a semiconductor substrate, wherein the tapered segment is buried below a surface of the semiconductor substrate to transition the received light within the semiconductor substrate from a first optical mode to a second optical mode to reduce a loss of light during propagation of the received light from the optical waveguide to the optical fiber wherein the tapered segment of the optical waveguide is coupled to an output facet to form an optical coupler and the output facet is etched within the semiconductor substrate.

12. The optical communications system of claim 11, further comprising a lens included in the semiconductor substrate to form a backside optical coupler to assist in coupling the optical waveguide to the optical fiber.

13. The optical communications system of claim 11, wherein the optical communication system comprises a transmitter and the light source comprises a laser.

14. The optical communications system of claim 11, wherein the optical communications system comprises an optical transceiver including the at least one optical apparatus and further includes one or more photodetectors, modulators, or splitters coupled to the semiconductor substrate.

* * * * *